March 17, 1936. H. T. CLINE 2,034,505
WEED CUTTING MACHINE FOR LAWNS, ETC
Filed June 26, 1934
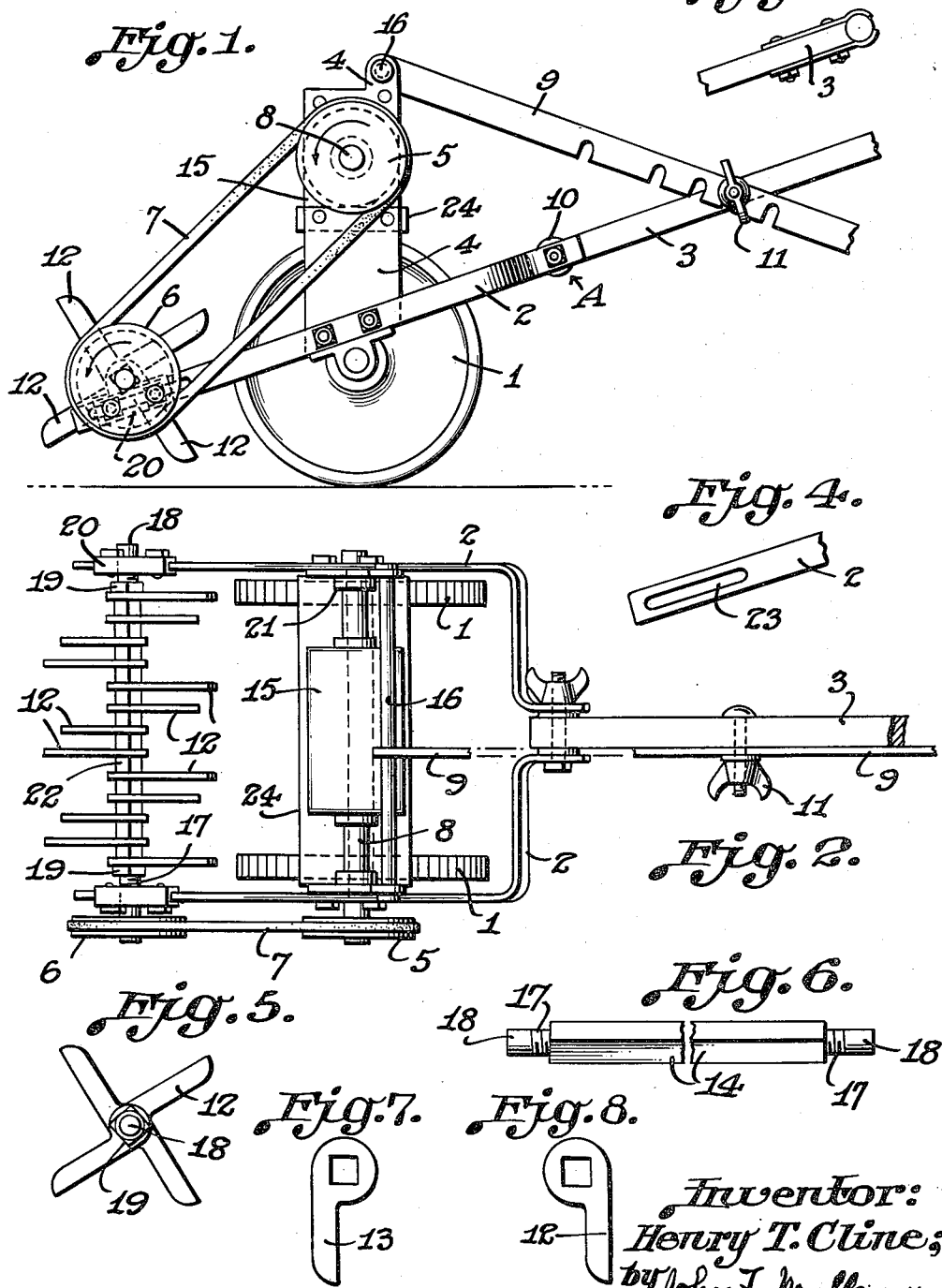

Patented Mar. 17, 1936

2,034,505

UNITED STATES PATENT OFFICE 2,034,505

WEED CUTTING MACHINE FOR LAWNS, ETC.

Henry T. Cline, Colorado Springs, Colo.

Application June 26, 1934, Serial No. 732,413

1 Claim. (Cl. 97—40)

This invention relates to new and useful improvements in weed cutting machines for lawns and similar grounds.

The principal object in view in this appliance is the cutting of spreading-leaved weeds such as plantain and dandelions and the like growths.

This I accomplish by means of the peculiar spread of the leaves or branches as compared with the lawn grass or similar grass.

The weed leaves spread out horizontally from one inch to several inches above the ground and I cut them off by driving the cutter longitudinally and transversely without cutting the short-mowed lawn grass, which escapes between the long blades 12, or 13, which are spaced apart as shown in Figure 2, which is a plan view of the machine.

Fig. 1 is a left side elevation of the machine with part of the guiding handle removed; Fig. 3 is an elevation of a part of said handle; Fig. 5 is a detail showing the rectangular relative positions of the blades 12, mounted on the hub 14; Fig. 4 is a separated end of arm 2 or 2' and showing the slot 23; Fig. 6 is the shaft upon which the cutting blades 12 and 13 are mounted; Fig. 7 is an elevation of blade 13, and Fig. 8 is an elevation of blade 12. A is the adjusting clamp in the handle 3.

The principal parts of my invention are the cutting cylinder, its carrying frame or vehicle and its motor.

The cylinder comprises a square shaft 14, with journals at both ends 18, and a threaded section between the square part and the journal ends, at 17.

In Fig. 5 an end diagrammatic elevation of part of the cylinder shows four of the cutting blades 12 mounted and secured by the clamping nut 19. This form shows a drawing movement of the cutting edge of the blades 12, which allows the grass to escape between them by the dragging movement; while the blades 13 would have a digging or pick-up tendency on grass or weed leaves. The journals 18 turn in the bearings 20 and 20' which may be adjusted by sliding on the frame bars 2 and 2' and as shown in Fig. 4 in the bolt slotway 23, to align the cylinder or to tighten the actuating belt 7 between the actuating pulley 5 and the driven pulley 6, Figs. 1 and 2.

The upright posts 4 and 4' are secured to the frame members 2, 2' and support the cross table 24 which supports the motor 15 which may be a gasoline motor or other form of motor, and which drives the shaft 8, which has its bearings supported on the upright posts 4, 4'. This shaft may be connected to drive the ground-wheels 1, but this application does not show that form.

It is desirable to have the cutting blades 12 and 13 to pass close to the surface of the ground, and this is regulated by the operator raising or lowering the handle at 3, in Figs. 1 and 3 to dip or lift the said blades, to the desired height above the ground. By raising the latch lever 9 and disconnecting it from the stud 25, the handle 3 may be adjusted to accommodate the height of convenient handling for different statures of different persons, and the cylinder may be raised clear to be protected while moving the machine from place to place. The latch lever may then be connected in another and desired notch and the winged nut 11, be tightened or loosened at A, to suit the operator, by adjusting the hinged joint A, which clamps the frame members 2, 2' on the metal discs 10, to stiffen the handle.

The latch lever 9 is hinged on the cross rod 16, which is secured to the top member of the posts 4, 4' which posts support the bearings for the shaft 8 at 21, 21'.

The shaft 14, is journaled in the bearings 20, 20' and it carries spacers shown at 22, 22, to separate the blades 12 which are provided with square holes through which the square shaft 14 is inserted, and the nuts 19 secure them in place.

I know that there have been devices for mowing lawns and weeds by cutting them low, but this was at the peril of killing the lawn-grass as well as the weeds. Also there have been devices for extracting weeds individually and singly by digging out the single root and so I do not claim broadly a weed destroyer, but what I claim is as follows:—

A weed-cutting machine of the class described comprising in combination a frame, ground wheels supporting said frame, a revolvable horizontal shaft mounted operatively on the front end of said frame in front of said wheels and at right angles to said frame, a handle-member extension hinged to the rear of said frame, a hinged adjusting rod secured to top of said frame at its front end and at its rear part secured adjustably to said extension, thin cutting-blades extending radially from said shaft and spaced apart to allow the blades of grass to escape between them but adapted to engage the transversely extending leaves of weeds amid the grass, said shaft and blades forming a cylinder, tilting means enabling the operator to tilt the frame so as to regulate the distance of said cylinder from the ground as desired to have the said blades engage the said leaves; and motor means mounted on said frame adapted to actuate said cylinder and said ground-wheels adjustably.

HENRY T. CLINE.